United States Patent
Nelogal et al.

(10) Patent No.: US 11,403,029 B2
(45) Date of Patent: Aug. 2, 2022

(54) SYSTEM AND METHOD FOR MANAGING CLEANING POLICIES OF STORAGE DEVICES IN STORAGE DEVICE POOLS USING SELF-MONITORED STATISTICS AND INPUT/OUTPUT STATISTICS

(71) Applicant: Dell Products L.P., Hopkinton, MA (US)

(72) Inventors: Chandrashekar Nelogal, Round Rock, TX (US); Rahul Deo Vishwakarma, Bangalore (IN); Parmeshwr Prasad, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/085,282

(22) Filed: Oct. 30, 2020

(65) Prior Publication Data

US 2022/0137853 A1   May 5, 2022

(51) Int. Cl.
*G06F 3/06* (2006.01)

(52) U.S. Cl.
CPC ............ *G06F 3/0653* (2013.01); *G06F 3/061* (2013.01); *G06F 3/0619* (2013.01); *G06F 3/0644* (2013.01); *G06F 3/0649* (2013.01); *G06F 3/0659* (2013.01); *G06F 3/0683* (2013.01)

(58) Field of Classification Search
CPC ...... G06F 3/0653; G06F 3/061; G06F 3/0619; G06F 3/0644; G06F 3/0649; G06F 3/0659; G06F 3/0683; G06F 12/00; G06F 13/00
See application file for complete search history.

(56) References Cited

U.S. PATENT DOCUMENTS

| | | | | |
|---|---|---|---|---|
| 7,350,046 B2* | 3/2008 | Sicola | ................. | G06F 11/0727 711/111 |
| 7,664,617 B2* | 2/2010 | Greco | ................. | G06F 11/3485 702/182 |
| 2005/0144403 A1* | 6/2005 | Jeddeloh | ............ | G06F 11/3409 711/154 |
| 2010/0153680 A1* | 6/2010 | Baum | ................... | G06F 11/008 711/173 |
| 2012/0203986 A1* | 8/2012 | Strasser | ................ | G06F 3/0688 711/158 |
| 2015/0039806 A1* | 2/2015 | Green | ................... | G06F 3/0676 711/103 |

\* cited by examiner

*Primary Examiner* — Tuan V Thai
(74) *Attorney, Agent, or Firm* — Chamberlain, Hrdlicka, White, Williams, & Aughtry

(57) ABSTRACT

A method for managing a plurality of storage devices includes obtaining, by a storage device cleaning manager, a set of self-monitored statistics, performing an initial concern analysis to generate an initial concern prediction for each of the plurality of storage devices in a storage system, wherein the set of self-monitored statistics are associated with the plurality of storage devices, updating a cleaning policy based on the initial concern prediction, obtaining input/output (I/O) statistics, after updating the cleaning policy based on the initial concern prediction, performing a secondary concern analysis using the I/O statistics to generate a secondary concern prediction for each of the plurality of storage devices, wherein the I/O statistics are associated with the plurality of storage devices, further updating the cleaning policy, and performing a cleaning of at least a portion of the plurality of storage devices based on the updated cleaning policy.

20 Claims, 7 Drawing Sheets

# SYSTEM AND METHOD FOR MANAGING CLEANING POLICIES OF STORAGE DEVICES IN STORAGE DEVICE POOLS USING SELF-MONITORED STATISTICS AND INPUT/OUTPUT STATISTICS

BACKGROUND

Computing devices in a system may include any number of computing resources such as processors, memory, and persistent storage. The computing resources, specifically the persistent storage devices, may be maintained by cleaning policies implemented on storage device pools of storage devices.

SUMMARY

In general, in one aspect, the invention relates to a method for managing a plurality of storage devices. The method includes obtaining, by a storage device cleaning manager, a set of self-monitored statistics, performing an initial concern analysis using the set of self-monitored statistics to generate an initial concern prediction for each of the plurality of storage devices in a storage system, wherein the set of self-monitored statistics are associated with the plurality of storage devices, updating a cleaning policy based on the initial concern prediction, obtaining input/output (I/O) statistics, after updating the cleaning policy based on the initial concern prediction, performing a secondary concern analysis using the I/O statistics to generate a secondary concern prediction for each of the plurality of storage devices, wherein the I/O statistics are associated with the plurality of storage devices, further updating the cleaning policy based on the secondary concern prediction to obtain an updated cleaning policy, and performing a cleaning of at least a portion of the plurality of storage devices based on the updated cleaning policy.

In one aspect, the invention relates to a non-transitory computer readable medium that includes computer readable program code, which when executed by a computer processor enables the computer processor to perform a method for managing a plurality of storage devices. The method includes obtaining, by a storage device cleaning manager, a set of self-monitored statistics, performing an initial concern analysis using the set of self-monitored statistics to generate an initial concern prediction for each of the plurality of storage devices in a storage system, wherein the set of self-monitored statistics are associated with the plurality of storage devices, updating a cleaning policy based on the initial concern prediction, obtaining input/output (I/O) statistics, after updating the cleaning policy based on the initial concern prediction, performing a secondary concern analysis using the I/O statistics to generate a secondary concern prediction for each of the plurality of storage devices, wherein the I/O statistics are associated with the plurality of storage devices, further updating the cleaning policy based on the secondary concern prediction to obtain an updated cleaning policy, and performing a cleaning of at least a portion of the plurality of storage devices based on the updated cleaning policy.

In one aspect, the invention relates to a system that includes a processor and memory that includes instructions which, when executed by the processor, perform a method. The method includes obtaining, by a storage device cleaning manager, a set of self-monitored statistics, performing an initial concern analysis using the set of self-monitored statistics to generate an initial concern prediction for each of the plurality of storage devices in a storage system, wherein the set of self-monitored statistics are associated with the plurality of storage devices, updating a cleaning policy based on the initial concern prediction, obtaining input/output (I/O) statistics, after updating the cleaning policy based on the initial concern prediction, performing a secondary concern analysis using the I/O statistics to generate a secondary concern prediction for each of the plurality of storage devices, wherein the I/O statistics are associated with the plurality of storage devices, further updating the cleaning policy based on the secondary concern prediction to obtain an updated cleaning policy, and performing a cleaning of at least a portion of the plurality of storage devices based on the updated cleaning policy.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing storage devices grouped in storage device pools. The storage devices may be cleaned using cleaning policies implemented by a storage device cleaning manager. The storage device cleaning manager may update the cleaning policies based on concern predictions performed on the storage devices. The concern predictions may be performed using statistics obtained from the storage devices. The statistics may include, for example, usage information about the data stored in each storage device, input/output (I/O) statistics, and/or any other statistics without departing from the invention. The storage device cleaning manager may further provide concern predictions diagnostics reports to an administrative system operating on the storage device cleaning manager.

Figure 1:
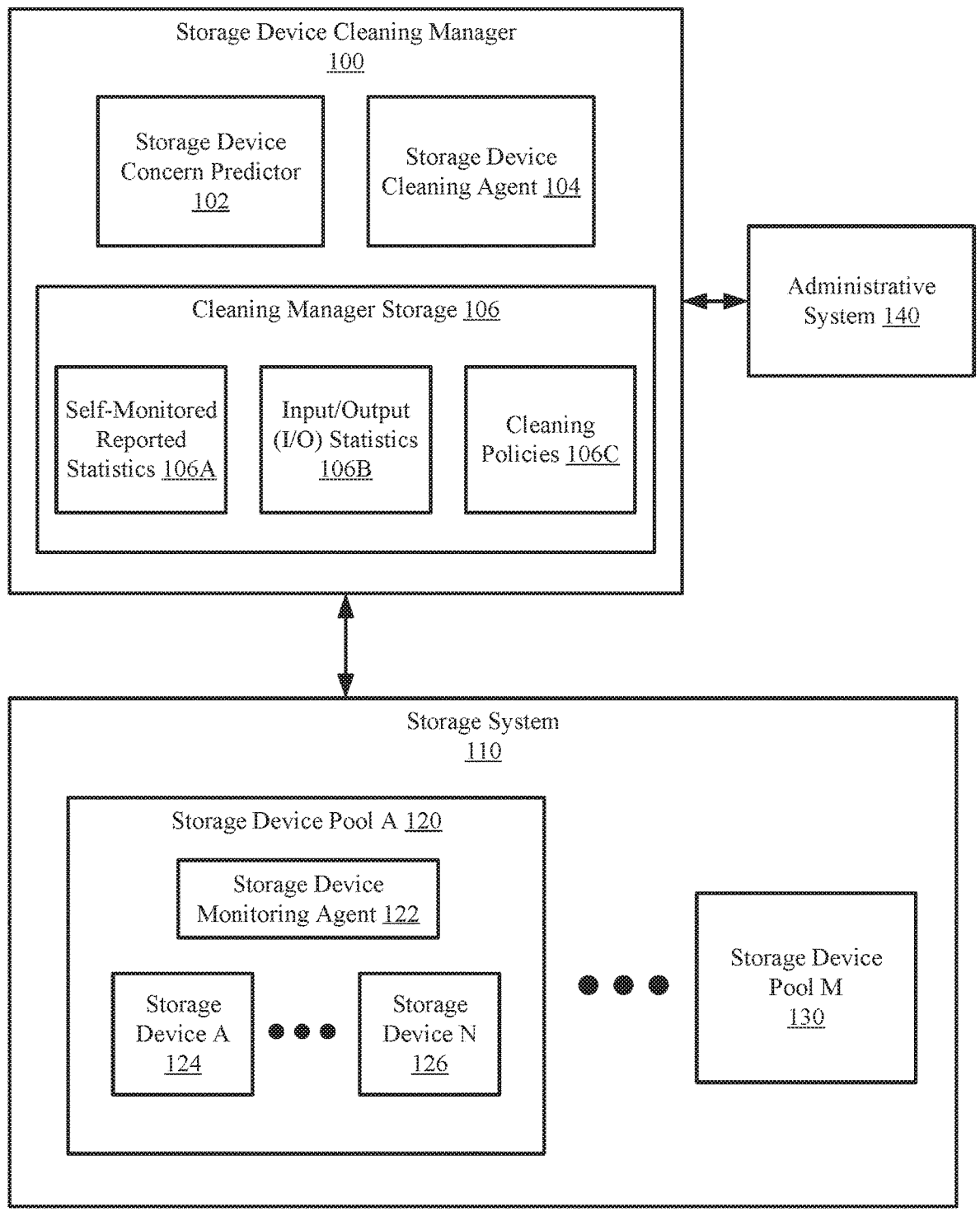
FIG. 1 shows a diagram of a system in accordance with one or more embodiments of the invention.

FIG. 1 shows a diagram of a system in accordance with one or more embodiments of the invention. The system includes a storage device cleaning manager (100), a storage system (110), and an administrative system (140). Each component of the system may be operably connected via any combination of wired and/or wireless connections. The system may include additional, fewer, and/or different components without departing from the invention. Each component of the system illustrated in FIG. 1 is discussed below.

In one or more embodiments of the invention, the storage device cleaning manager (100) manages the cleaning of the storage devices (124, 126) in the storage system. In one or more embodiments of the invention, "cleaning" of a storage device refers to the process of performing a monitoring for the integrity of the data stored in the storage device. The monitoring may include reading the data and comparing the data at the point in time of the cleaning to the data at a previous point in time when the data was considered in a healthy state. The comparison may be performed, for example, by generating a hash value of the data at the previous point in time and re-generating a second hash value of the data at the point in time of the cleaning and determining whether the two hash values match. In this example, if the hash values match, the data may be considered being in a healthy state. Additionally, as a second embodiment, the monitoring may include performing a method to verify the health of a data storage medium (e.g., a disk drive, a solid state drive, a flash drive, etc.) on the storage device. Any data (or storage medium) that is not in a healthy state may be flagged (e.g., tagged as unhealthy) without departing from the invention.

In one or more embodiments of the invention, the storage device concern predictor (102) monitors data obtained from storage device pools (120, 130) to generate concern predictions associated with each storage device (124, 126) in the storage system (110). The concern predictions may be initial concern predictions or secondary concern predictions (discussed in FIG. 2). The storage device concern predictor (102) may provide the concern predictions to the storage device cleaning agent (104).

In one or more embodiments of the invention, the storage device cleaning agent (104) performs cleaning of the storage devices (124, 126) in the storage device pools (120, 130). As discussed above, "cleaning" refers to the process of deleting (or otherwise removing) all or a portion of data stored in a storage device based on cleaning policies (106C) that may specify, for example, a schedule for performing monitoring on storage devices and/or data storage mediums associated with the storage devices. To perform the aforementioned functionality, the storage device cleaning manager (100) includes a storage device concern predictor (102), a storage device cleaning agent (104), and cleaning manager storage (106). The storage device cleaning manager (100) may include additional, fewer, and/or different components without departing from the invention.

In one or more embodiments of the invention, the self-monitored reported statistics (106A) are data structures that specify statistics about the storage devices (124, 126) as provided by the storage device pools (120, 130) associated with the corresponding storage devices. Examples of statistics of a storage device specified in the self-monitored reported statistics (106A) include, but are not limited to: power usage, number of hours in which a storage device is powered on, number of times the storage device is powered on or powered off, an average amount of data storage over a period of time, and a number of recoveries performed on data in the storage device.

In one or more embodiments of the invention, the I/O statistics (106B) are data structures that specify statistics about the I/O associated with the storage devices (124, 126). The I/O statistics (106B) for a given storage device (124, 126) may specify, for example, a read rate at a specified period of time, a write rate at a specified period of time, a bit error rate at a specified period of time, latency in the read or write of the data in the storage device at a specified period of time, and/or any other statistics without departing from the invention.

Figure 2:
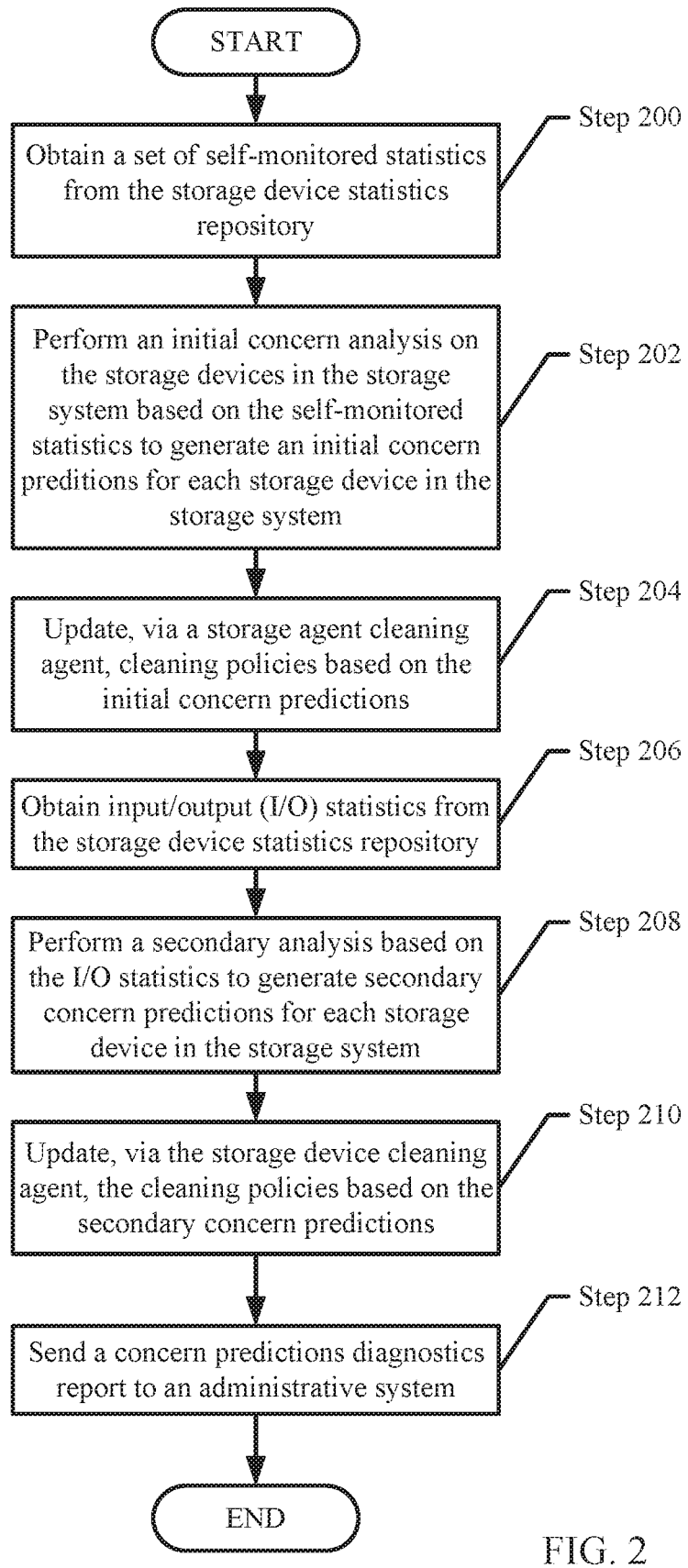
FIG. 2 shows a flowchart for managing a set of storage devices in accordance with one or more embodiments of the invention.

In one or more embodiments of the invention, the self-monitored reported statistics (106A) may be obtained from storage device monitoring agents (122) in accordance with, e.g., the method of FIG. 2. The self-monitored reported statistics (106A) may be a collection of statistics obtained over a large period of time (e.g., 3 months, 6 months, one year, more than one year, etc.). In contrast, the I/O statistics (106B) may be a collection of statistics obtained over shorter periods of time (e.g., one hour, 24 hours, one week, etc.) relative to that of the self-reported statistics (106A). Further, the I/O statistics (106B) may be obtained from the storage device monitoring agent (122) of each storage device pool (120, 130) and/or directly from the storage devices (124, 126) via the storage device cleaning agent (100).

In one or more embodiments of the invention, the cleaning policies (106C) are data structures that specify policies to be implemented on the storage system (110) for cleaning the storage devices in each storage device pool (120, 130). The cleaning policies (106C) of a given storage device (124, 126) may specify, for example, a schedule for cleaning a storage device, a retention policy for the data stored in the storage device, and/or any other policies without departing from the invention. The cleaning policies may each be associated with a storage device pool (120, 130) and/or a storage device (124, 126) in a storage device pool (120, 130).

Figure 4:
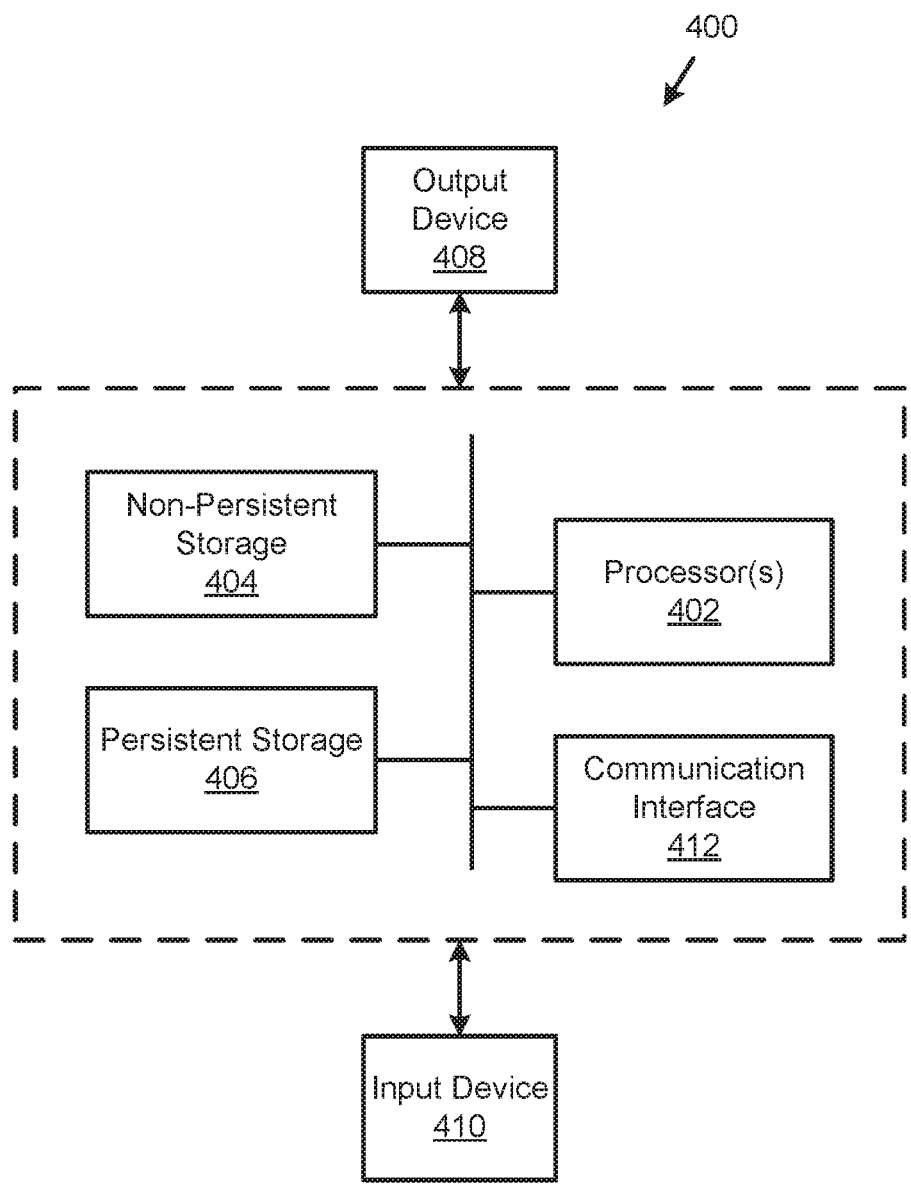
FIG. 4 shows a diagram of a computing device in accordance with one or more embodiments of the invention.

In one or more embodiments of the invention, the storage device cleaning manager (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the storage device cleaning manager (100) described in this application.

The storage device cleaning manager (100) may be implemented as a logical device without departing from the invention. The logical device utilizes computing resources of any number of physical computing devices to provide the functionality of the storage device cleaning manager (100) described throughout this application and/or all, or portion, of the method illustrated in FIG. 2. For additional details regarding the storage device cleaning manager, see, e.g., FIG. 1B.

In one or more embodiments of the invention, the storage system (110) is a system of storage devices organized in storage device pools (120, 130). Each storage device pool (120, 130) may include a storage device monitoring agent (122) that provides data to the storage device cleaning manager (100) and one or more storage devices (124, 126) that store data. Each storage device (124, 126) may be, persistent storage (e.g., disk drives, solid state drives, etc.). Each storage device pool (120, 130) may include additional, fewer, and or different components.

In one or more embodiments of the invention, each storage device pool (120, 130) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (124, 126). The persistent storage may store computer instructions, e.g., computer code, that when executed by the processor(s) of the computing device cause the computing device to perform the functions of the storage device pool (120, 130) described throughout this application.

A storage device pool (120, 130) may be implemented as a logical device without departing from the invention. The logical device utilizes computing resources of any number of physical computing devices to provide the functionality of the storage device pool (120, 130) described throughout this application.

In one or more embodiments of the invention, the administrative system (140) may coordinate with the storage device cleaning manager (100) before, during, and/or after a cleaning process. The administrative system (140) may communicate with the storage device cleaning manager (100) to select configuration options for configuring the cleaning process of the storage system (110). The configuration may include, for example, modifying the cleaning policies (106C) in response to concern predictions diagnostics reports (discussed in FIG. 2) obtained from the storage device cleaning manager (100).

In one or more embodiments of the invention, the administrative system (140) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the administrative system (140) described throughout this application.

The administrative system (140) may be implemented as a logical device without departing from the invention. The logical device utilizes computing resources of any number of physical computing devices to provide the functionality of the administrative system (140) described throughout this application.

FIG. 2 shows a flowchart in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 2 may be performed in parallel with any other steps shown in FIG. 2 without departing from the scope of the invention.

FIG. 2 shows a flowchart for a method for managing a set of storage devices in accordance with one or more embodiments of the invention. The method shown in FIG. 2 may be performed by, for example, a storage device cleaning manager (110, FIG. 1A). Other components of the system illustrated in FIG. 1A may perform the method of FIG. 3A without departing from the invention.

Turning to FIG. 2, in step 200, a set of self-monitored statistics is obtained from the storage device statistics repository. In one or more embodiments of the invention, the self-monitored statistics are obtained in response to a request to analyze and/or update the cleaning policies. The request may be obtained from an administrative system.

In step 202, an initial concern analysis is performed on the storage devices in the storage system based on the self-monitored statistics to generate initial concern predictions for each storage device in the storage system. The initial concern analysis may include applying a classification algorithm on the self-monitored statistics, which are each associated with a storage device, and grouping the storage devices based on a risk of concern (e.g., high concern, medium concern, low concern). Each storage device is assigned an initial concern prediction based on the risk of concern of the storage device as determined by the classification algorithm.

The classification algorithm may be a machine learning algorithm that performs classification on a set of inputs (e.g., the storage devices) based on a set of parameters (e.g., the self-monitored statistics). Examples of classification algorithms include, but are not limited to, k-nearest neighbor (kNN), support vector machines (SVM), least squares SVM, and neural networks.

In step 204, cleaning policies are updated based on the initial concern predictions. In one or more embodiments of the invention, the cleaning policies are updated by identifying the storage devices with medium or high levels of concern. The cleaning policies associated with each identified storage devices are updated to increase a schedule of such storage devices. The increase in schedule may correspond to the level of concern. For example, the schedule of a storage device of a high level of concern may be increased to a higher frequency than the schedule of a storage device with a medium level of concern.

In step 206, I/O statistics are obtained from the storage device statistics repository. In one or more embodiments of the invention, the I/O statistics are obtained in response to generating the initial concern predictions for the storage devices.

In step 208, a secondary concern analysis is performed based on the I/O statistics to generate secondary concern predictions for each storage device in each storage device pool in the storage system. Similar to the initial concern analysis, the secondary concern analysis may include performing a classification algorithm on the I/O statistics, which are each associated with a storage device, and assigning a level of concern. Each storage device is assigned a secondary concern prediction based on the risk of concern of the storage device as determined by the classification algorithm In one or more embodiments of the invention, the secondary concern analysis may further utilize the self-monitored statistics to generate the secondary concern predictions.

In one or more embodiments of the invention, the secondary concern prediction may be binary (e.g., "concern" or "no concern") or more granular (e.g., "high level of concern", "medium level of concern", or "minimal level of concern"). The secondary concern predictions may specify any other levels of concern without departing from the invention.

In step 210, the cleaning policies are updated based on the secondary concern predictions. Similar to step 204, the cleaning policies may be updated by identifying the storage device pools that are associated with the storage devices with medium or high levels of concern as specified in the secondary concern predictions. The cleaning policies associated with each identified storage device pool is updated to increase a schedule of such storage devices. The increase in schedule may correspond to the level of concern.

In step 212, a concern predictions diagnostics report is sent to an administrative system. In one or more embodiments of the invention, the concern predictions diagnostics report specifies statistics about the initial concern predictions and/or the secondary concern predictions.

In one or more embodiments of the invention, the storage device cleaning manager may include functionality to implement the cleaning policies on the storage system at any point while performing the method of FIG. 2. For example, the storage device cleaning manager may implement the cleaning policies after step 204 (e.g., after the first update of the cleaning policies) and before step 210 (e.g., before the second update of the cleaning policies). Implementing the cleaning policies may include, for example, monitoring the storage devices in accordance with the schedule specified in the cleaning policies and performing remediation on the data storage mediums in such storage devices determined to not be in a healthy state.

EXAMPLE

The following section describes an example. The example, illustrated in FIGS. 3A-3D, is not intended to limit the invention. Turning to the example, consider a scenario in which a storage device cleaning manager manages a storage system that includes a set of three storage device pools.

Figure 3A:
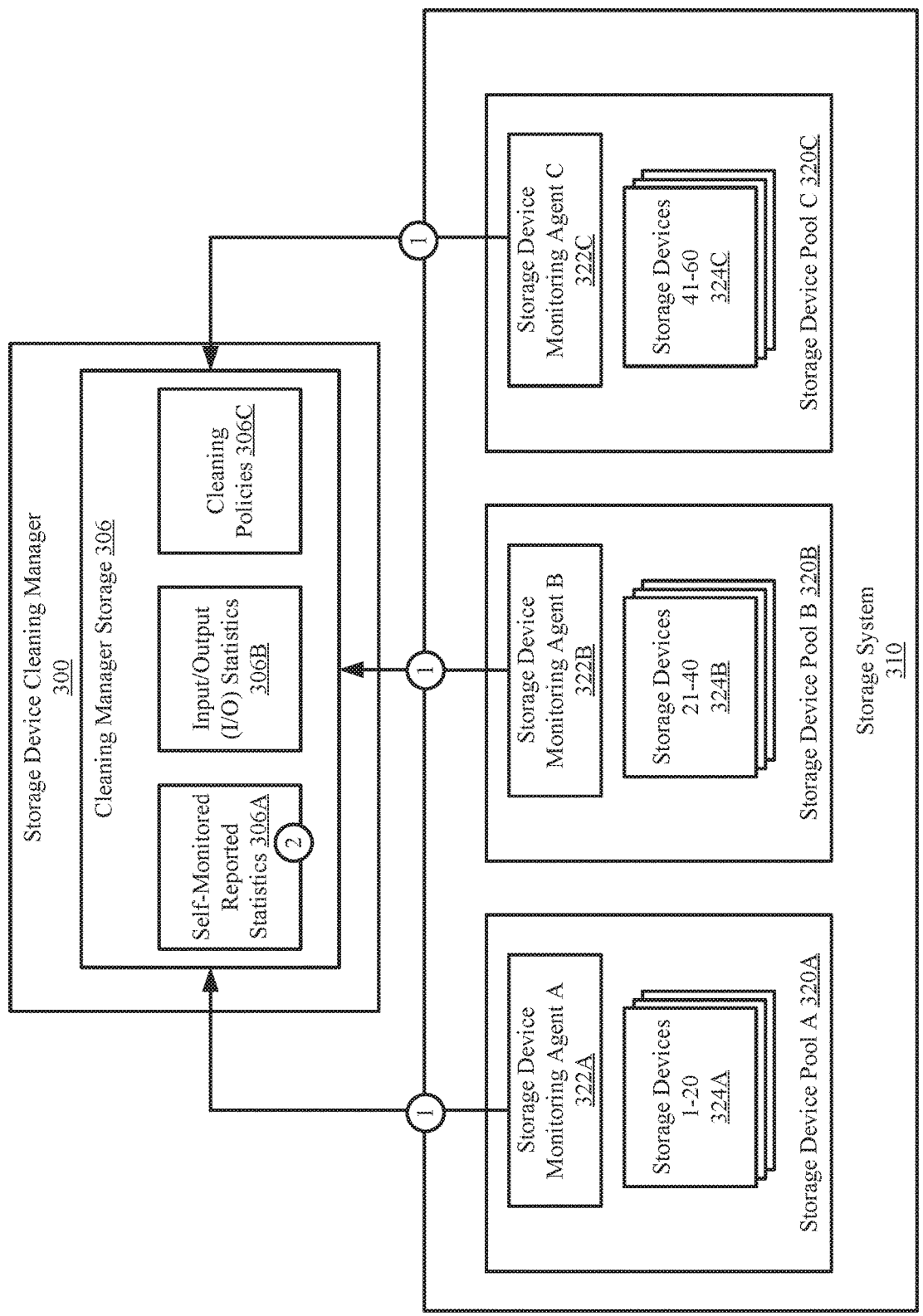
FIGS. 3A-3D show an example in accordance with one or more embodiments of the invention.

FIG. 3A shows a diagram of an example system. The example system includes a storage device cleaning manager (300) and a storage system (310). For the sake of brevity, not all components of the example system are illustrated in FIG. 3A. Turning to FIG. 3A, the storage system (310) includes three storage device pools (320A, 320B, 320C). Each storage device pool includes a storage device monitoring agent (e.g., storage device pool A (320A) includes storing device monitoring agent A (322A), storage device pool B (320B) includes storing device monitoring agent B (322B), and storage device pool C (320C) includes storing device monitoring agent C (322C)).

Over a period of six months, each storage device monitoring agent (322A, 322B, 322C) provides self-monitored statistics associated with each corresponding storage device. Specifically, storage device monitoring agent A (322A) provides self-monitored statistics about storage devices 1-20 (324A), storage device monitoring agent B (322B) provides self-monitored statistics about storage devices 21-40 (324B), and storage device monitoring agent C (322C) provides self-monitored statistics about storage devices 41-60 (324C) [1]. The self-monitored statistics specify a number of hours that each storage device is powered on, an average amount of data that each storage device stores over the six-month period of time, and a number of times each storage device is powered off and back on. Collectively, the self-monitored statistics (306A) are stored in a cleaning manager storage (306) of the storage device cleaning manager (300) [2].

Figure 3B:
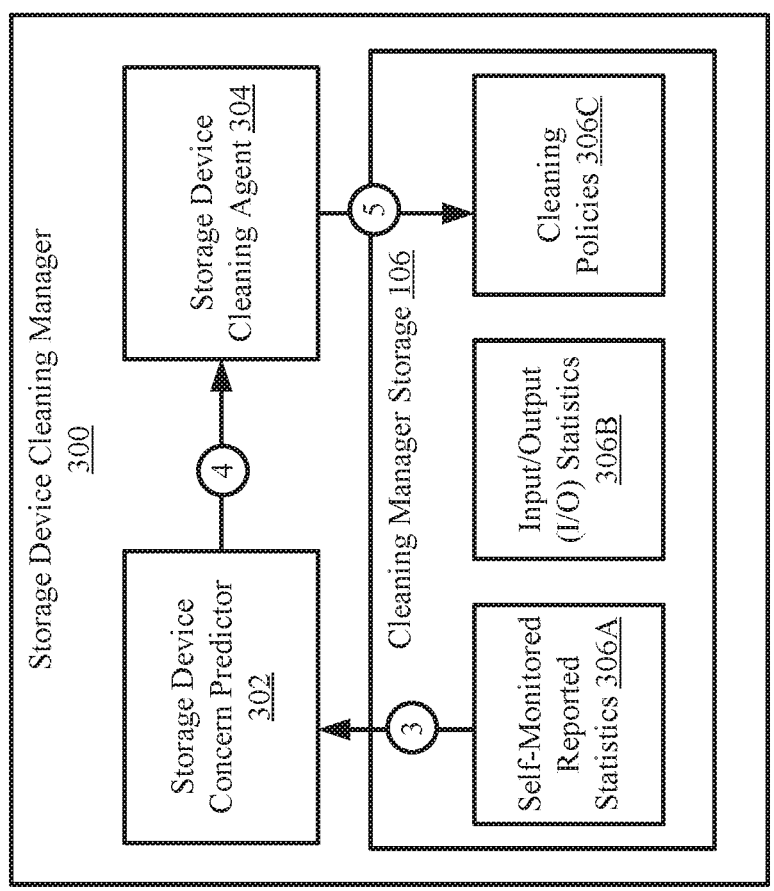

FIG. 3B shows a second diagram of the example system. For the sake of brevity, not all components of the example system are illustrated in FIG. 3B. At a point in time after the self-monitored statistics (306A) are stored in the cleaning manager storage (306), a storage device concern predictor (302) of the storage device cleaning manager (306A) performs the method of FIG. 2 to perform an initial concern analysis to generate initial concern predictions of each of the 60 storage devices (i.e., 324A, 324B, 324C) [3]. The initial concern predictions specify that storage devices 2, 7, 14 of the storage device pool A (322A), storage device 35 of storage device pool B (322B), and storage devices 46 and 51 of storage device pool C (322C) are each a medium level risk of concern.

The remaining storage devices in the storage device system (310) are at a minimal level risk of concern. The initial concern predictions are provided to a storage device cleaning agent (304) of the storage device cleaning manager (300) [4]. In response to the initial concern predictions, the storage device cleaning agent (304) increases the schedule of data cleaning from those storage devices with medium level risk of concern from once every year to once every six months [5].

Figure 3C:
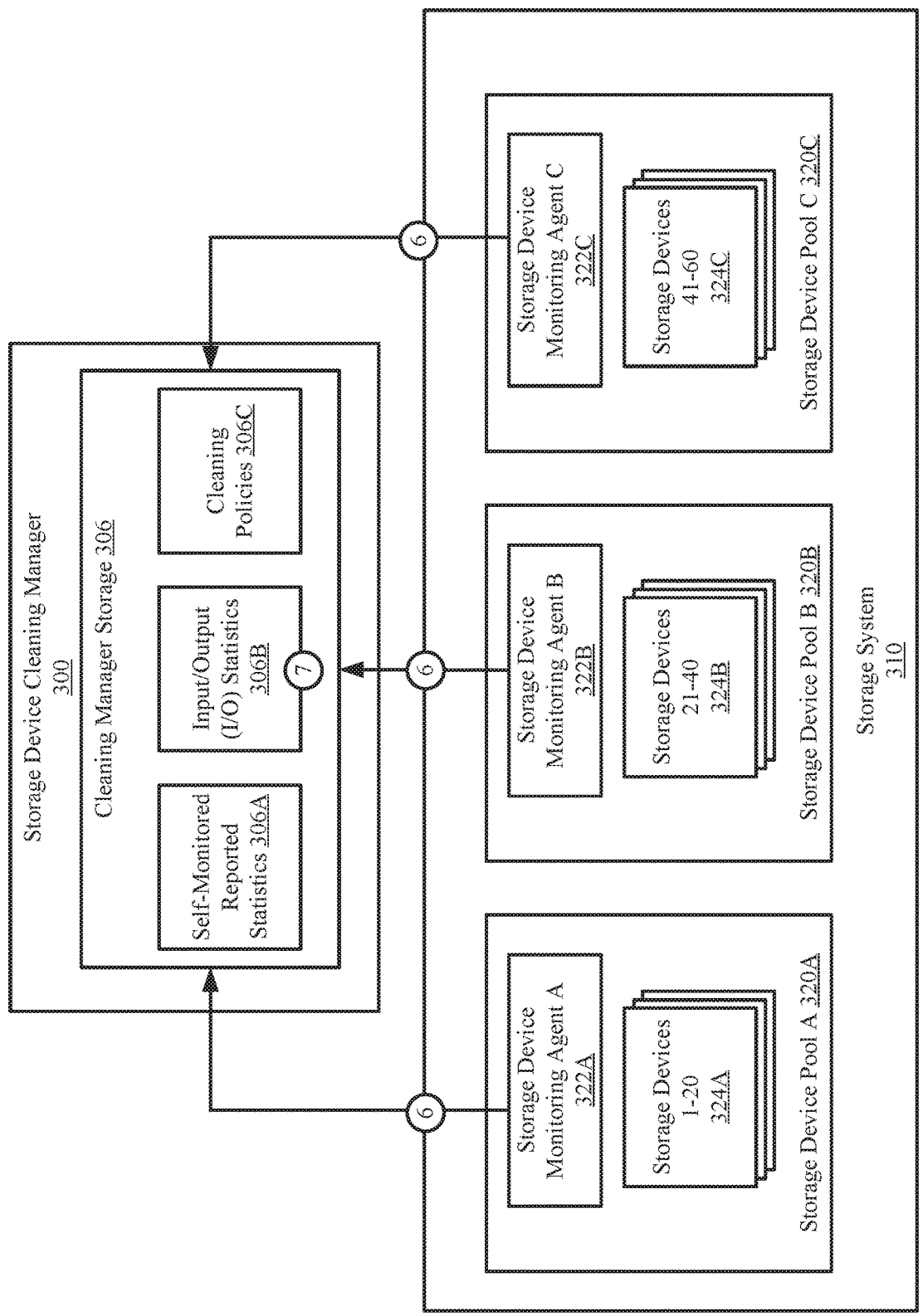

FIG. 3C shows a third diagram of the example system. For the sake of brevity, not all components of the example system are illustrated in FIG. 3C. The storage device monitoring agents (322A, 322B, 322C) of each respective storage device pool (320A, 320B, 320C) sends I/O statistics corresponding to bit error rates calculated by the storage device monitoring agents (322A, 322B, 322C) for each respective storage device in the storage system (310). The I/O statistics further specify any latency spikes identified in obtaining the I/O operations from the storage devices (324A, 324B, 324C). The I/O statistics are sent by each storage device monitoring agent (322A, 322B, 322C) to the storage device cleaning manager (300). The I/O statistics (306B) are collectively stored in the cleaning manager storage (306) [7].

Figure 3D:
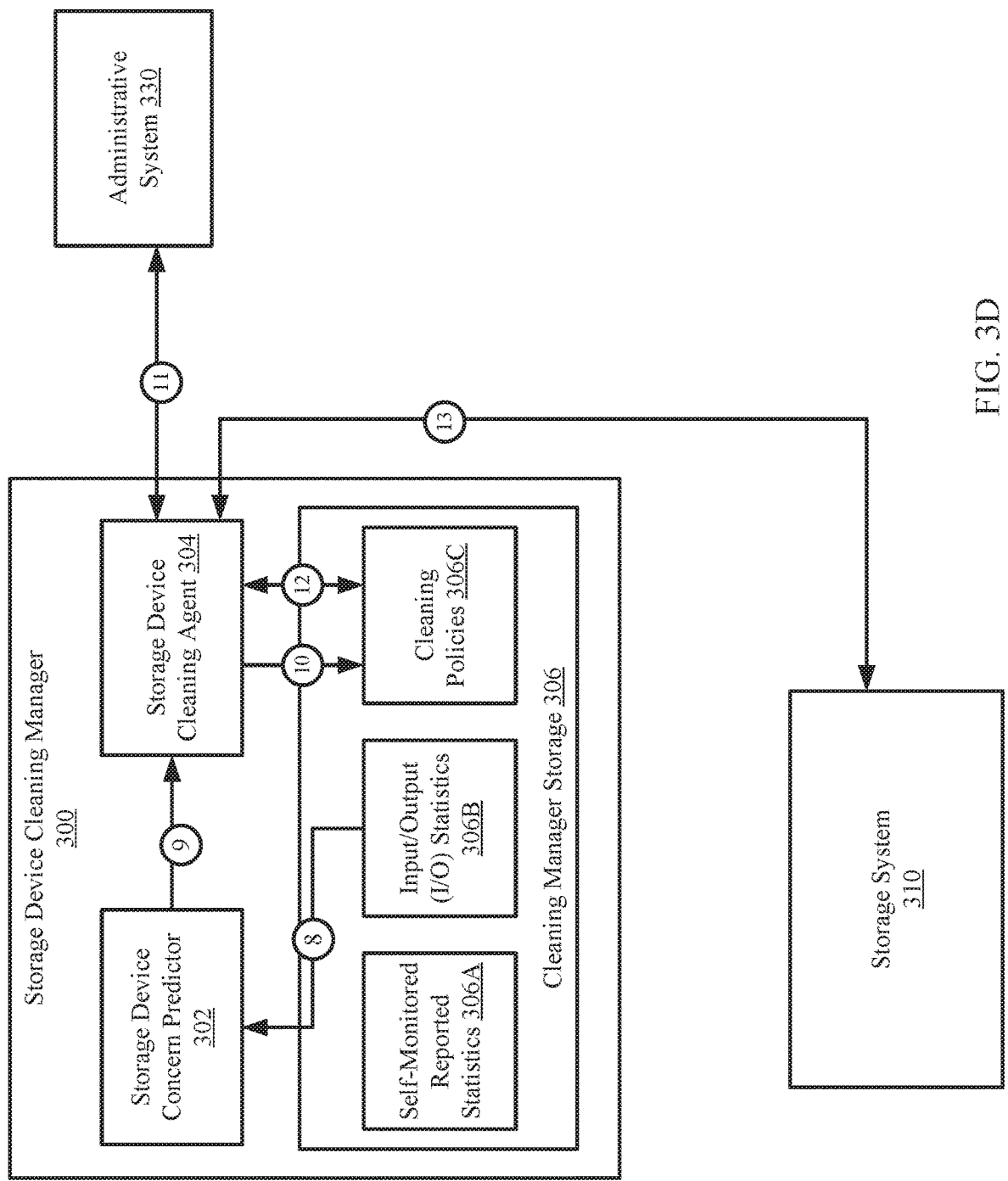

FIG. 3D shows a fourth diagram of the example system. For the sake of brevity, not all components of the example system are illustrated in FIG. 3D. After storage of the I/O statistics (306B), the storage device concern predictor (302) obtains the I/O statistics (306B) and performs the method of FIG. 2 to perform a secondary concern analysis to generate secondary concern predictions [8]. The secondary concern predictions are based on the identified latency spikes and the bit-error rates specified in the I/O statistics (306B) to determine a high level risk of concern for storage devices 10 and 46. The secondary concern predictions specify the remaining storage devices as being of a minimal level risk of concern. The secondary concern predictions are provided to the storage device cleaning agent (304) [9]. In response to the secondary concern predictions, the storage device cleaning agent (304) further updates the cleaning policies (306C) to specify increasing the schedule of storage devices 10 and 46 from cleaning once a year to cleaning once every six months [10]. Further, a concern predictions diagnostics report is sent to an administrative system (330) [11]. The concern predictions diagnostics report specifies a range of error in the initial concern predictions and the secondary concern predictions.

At a later point in time, the storage device cleaning agent (304) implements the cleaning policies (306C) [12]. Specifically, the storage device cleaning agent (304) identifies, using the cleaning policies (306C), that storage devices 2, 7, 10, 14, 46, and 51 have reached the six month period of cleaning. In this manner, a data cleaning is performed on the identified storage devices in the storage system (310) [13].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the efficiency of managing storage devices. Instead of performing cleaning using the same cleaning policies for all storage devices in a storage device pool, embodiments of the invention analyze storage devices at a granular level to provide tailored cleaning policies for storage devices that may be of an increased risk of concern than other storage devices in the storage device pool. Further, once initial statistics (e.g., the self-monitored statistics) that do not require granular monitoring of the storage devices are obtained, embodiments of the invention enable a storage device cleaning manager to begin modifying the cleaning policies even before obtaining other statistics (e.g., the I/O statistics) that may require a more involved monitoring of the storage devices.

Thus, embodiments of the invention may address the problem of inefficient use of computing resources. This problem arises due to the technological nature of the environment in which storage systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a plurality of storage devices, the method comprising:
obtaining, by a storage device cleaning manager, a set of self-monitored statistics;
performing an initial concern analysis using the set of self-monitored statistics to generate an initial concern prediction for each of the plurality of storage devices in a storage system, wherein the set of self-monitored statistics are associated with the plurality of storage devices;
updating a cleaning policy for a second plurality of storage devices based on the initial concern prediction, wherein the cleaning policy specifies a schedule for cleaning data in the second plurality of storage devices, and
wherein the plurality of storage devices comprises the second plurality of storage devices;
obtaining input/output (I/O) statistics;
after updating the cleaning policy based on the initial concern prediction, performing a secondary concern analysis using the I/O statistics to generate a secondary concern prediction for each of the plurality of storage devices, wherein the I/O statistics are associated with the plurality of storage devices;
further updating the cleaning policy based on the secondary concern prediction to obtain an updated cleaning policy; and
performing a cleaning of the second plurality of storage devices based on the updated cleaning policy.

2. The method of claim 1, further comprising:
sending a concern predictions diagnostics report to an administrative system.

3. The method of claim 1, wherein the initial concern analysis comprises performing a classification analysis on the set of self-monitored statistics.

4. The method of claim 3, wherein a portion of the set of self-monitored statistics is provided to the storage device cleaning manager by a storage device monitoring agent associated with a storage device pool of the storage device pools.

5. The method of claim 1, wherein the plurality of the storage devices are grouped into storage device pools.

6. The method of claim 1, wherein the set of self-monitored statistics comprise at least one of: power usage, number of hours in which a storage device in the plurality of storage devices is powered on, a number of times the storage device is powered on, and an average amount of data storage in the storage device over a period of time.

7. The method of claim 1, wherein the I/O statistics comprise at least one of: a read rate at a specified period of time, a write rate at the specified period of time, a bit error rate at the specified period of time, and a latency spike in the read rate or write rate.

8. A non-transitory computer readable medium comprising computer readable program code, which when executed by a computer processor enables the computer processor to perform a method for managing a plurality of storage devices, the method comprising:

obtaining, by a storage device cleaning manager, a set of self-monitored statistics;

performing an initial concern analysis using the set of self-monitored statistics to generate an initial concern prediction for each of the plurality of storage devices in a storage system, wherein the set of self-monitored statistics are associated with the plurality of storage devices;

updating a cleaning policy for a second plurality of storage devices based on the initial concern prediction,
wherein the cleaning policy specifies a schedule for cleaning data in the second plurality of storage devices, and
wherein the plurality of storage devices comprises the second plurality of storage devices;

obtaining input/output (I/O) statistics;

after updating the cleaning policy based on the initial concern prediction, performing a secondary concern analysis using the I/O statistics to generate a secondary concern prediction for each of the plurality of storage devices, wherein the I/O statistics are associated with the plurality of storage devices;

further updating the cleaning policy based on the secondary concern prediction to obtain an updated cleaning policy; and performing a cleaning of the second plurality of storage devices based on the updated cleaning policy.

9. The non-transitory computer readable medium of claim 8, the method further comprising:

sending a concern predictions diagnostics report to an administrative system.

10. The non-transitory computer readable medium of claim 8, wherein the initial concern analysis comprises performing a classification analysis on the set of self-monitored statistics.

11. The non-transitory computer readable medium of claim 8, wherein the plurality of the storage devices are grouped into storage device pools.

12. The non-transitory computer readable medium of claim 11, wherein a portion of the set of self-monitored statistics are provided to the storage device cleaning manager by a storage device monitoring agent associated with a storage device pool of the storage device pools.

13. The non-transitory computer readable medium of claim 8, wherein the set of self-monitored statistics comprise at least one of: a power usage, a number of hours in which a storage device in the plurality of storage devices is powered on, a second number of times the storage device is powered on, and an average amount of data storage in the storage device over a period of time.

14. The non-transitory computer readable medium of claim 8, wherein the I/O statistics comprise at least one of: a read rate at a specified period of time, a write rate at the specified period of time, a bit error rate at the specified period of time, and a latency spike in the read rate or write rate.

15. A system, comprising:
a processor; and
memory comprising instructions which, when executed by the processor, perform a method, the method comprising:

obtaining, by a storage device cleaning manager, a set of self-monitored statistics;

performing an initial concern analysis using the set of self-monitored statistics to generate an initial concern prediction for each of a plurality of storage devices in a storage system, wherein the set of self-monitored statistics are associated with the plurality of storage devices;

updating a cleaning policy for a second plurality of storage devices based on the initial concern prediction,
wherein the cleaning policy specifies a schedule for cleaning data in the second plurality of storage devices, and
wherein the plurality of storage devices comprises the second plurality of storage devices;

obtaining input/output (I/O) statistics;

after updating the cleaning policy based on the initial concern prediction, performing a secondary concern analysis using the I/O statistics to generate a secondary concern prediction for each of the plurality of storage devices,
wherein the I/O statistics are associated with the plurality of storage devices;

further updating the cleaning policy based on the secondary concern prediction to obtain an updated cleaning policy; and performing a cleaning of the second plurality of storage devices based on the updated cleaning policy.

16. The system of claim 15, the method further comprising:

sending a concern predictions diagnostics report to an administrative system.

17. The system of claim 15, wherein the initial concern analysis comprises performing a classification analysis on the set of self-monitored statistics.

18. The system of claim 17, wherein a portion of the set of self-monitored statistics are provided to the storage device cleaning manager by a storage device monitoring agent associated with a storage device pool of the storage device pools.

19. The system of claim 15, wherein the plurality of the storage devices are grouped into storage device pools.

20. The system of claim 15,
wherein the set of self-monitored statistics comprise at least one of: a power usage, a number of hours in which a storage device in the plurality of storage devices is powered on, a second number of times the storage device is powered on, and an average amount of data storage in the storage device over a period of time, and
wherein the I/O statistics comprise at least one of: a read rate at a specified period of time, a write rate at the specified period of time, a bit error rate at the specified period of time, and a latency spike in the read rate or write rate.

* * * * *